United States Patent
Liu et al.

(10) Patent No.: US 7,128,768 B2
(45) Date of Patent: Oct. 31, 2006

(54) HYDROGEN GENERATOR FOR HYDROGEN DESULFURIZATION OF HYDROCARBON FEEDS

(75) Inventors: Ke Liu, East Longmeadow, MA (US); Richard J. Bellows, Ellington, CT (US); John L. Preston, Jr., Hebron, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 2 days.

(21) Appl. No.: 10/731,291

(22) Filed: Dec. 9, 2003

(65) Prior Publication Data

US 2004/0159585 A1    Aug. 19, 2004

Related U.S. Application Data

(63) Continuation-in-part of application No. 10/369,359, filed on Feb. 18, 2003.

(51) Int. Cl.
*B01J 3/24* (2006.01)

(52) U.S. Cl. .............. 48/61; 48/62 R; 48/63; 48/89; 48/102 R; 48/107; 48/94; 48/95; 48/127.9; 48/211; 48/198.1; 48/212; 48/198.7; 48/214; 48/215; 422/188; 422/189; 422/190; 422/211; 422/222; 422/234

(58) Field of Classification Search .......... 48/61, 48/62 R, 63, 89, 102 R, 107, 94, 95, 127.9, 48/211, 198.1, 212, 198.7, 214 R, 215, 214 A; 422/188–190, 211, 222, 234
See application file for complete search history.

(56) References Cited

U.S. PATENT DOCUMENTS

| | | | | |
|---|---|---|---|---|
| 3,898,153 | A | * | 8/1975 | Louder et al. ............... 208/89 |
| 5,360,679 | A | * | 11/1994 | Buswell et al. ............. 429/19 |
| 5,883,138 | A | * | 3/1999 | Hershkowitz et al. ...... 518/703 |

* cited by examiner

*Primary Examiner*—Glenn Caldarola
*Assistant Examiner*—Vinit H. Patel
(74) *Attorney, Agent, or Firm*—M. P. Williams

(57) ABSTRACT

A hydrogen-rich reformate gas generator (36), such as a mini-CPO, POX, ATR or other hydrogen generator provides warm, dry, hydrogen-rich reformate gas to a hydrogen desulfurizer (17) which provides desulfurized feedstock gas to a major reformer (14) (such as a CPO) which, after processing in a water-gas shift reactor (26) and preferential CO oxidizer (27) produces hydrogen-containing reformate in a line (31) for use, for instance, as fuel for a fuel cell power plant. The expensive prior art hydrogen blower (30) is thereby eliminated, thus reducing parasitic power losses in the power plant. The drier reformate provided by the small hydrogen generator to the hydrogen desulfurizer favors hydrogen sulfide adsorption on zinc oxide and helps to reduce sulfur to the parts per billion level.

13 Claims, 2 Drawing Sheets

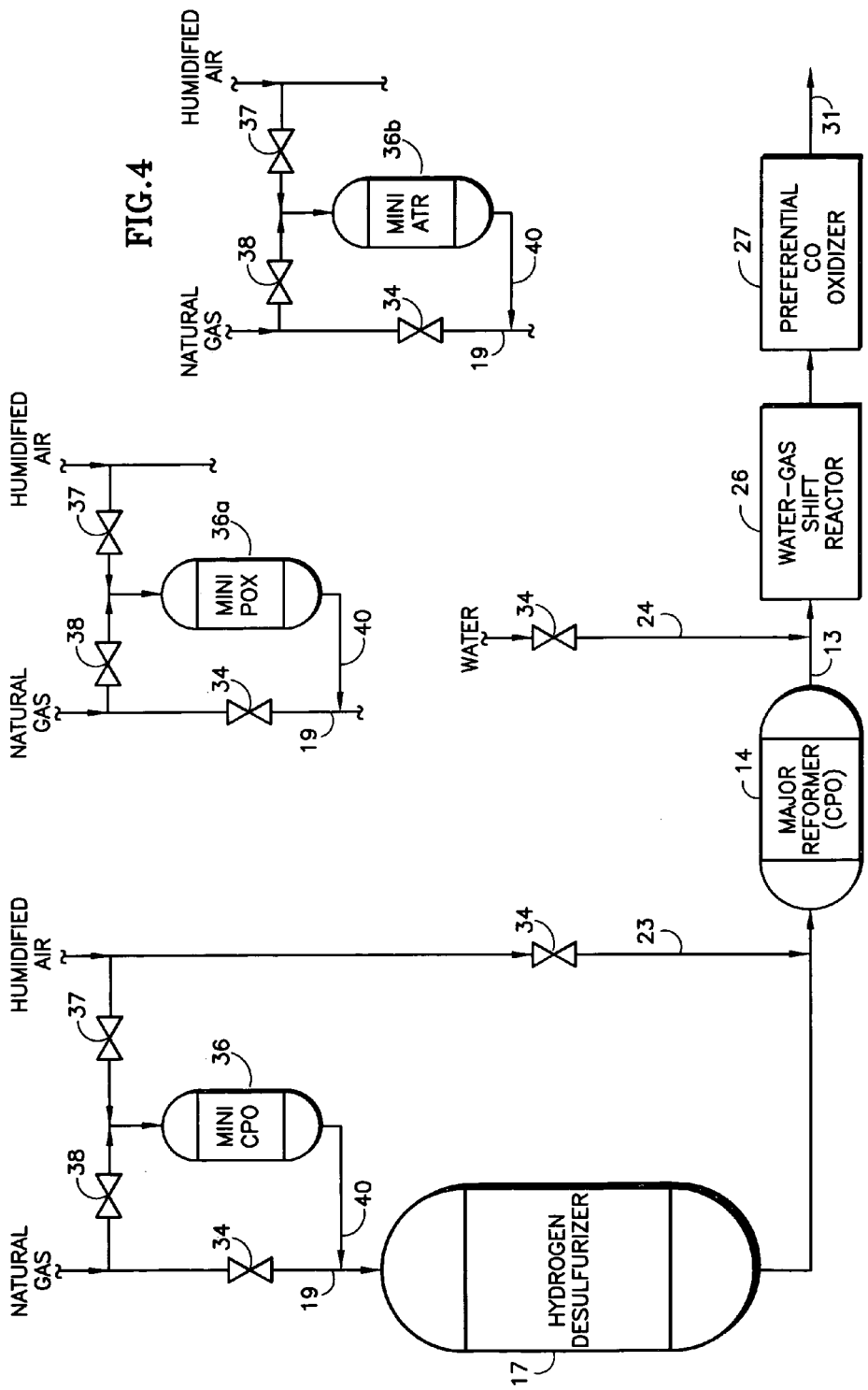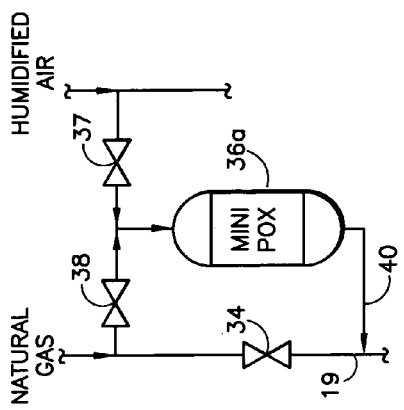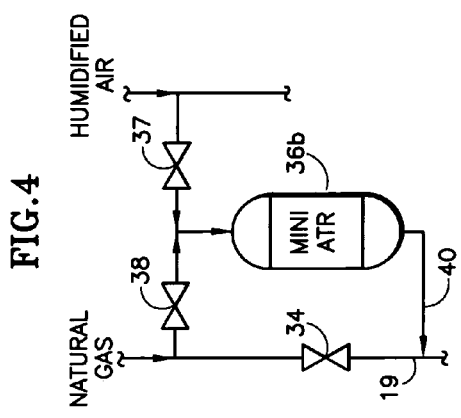

HYDROGEN GENERATOR FOR HYDROGEN DESULFURIZATION OF HYDROCARBON FEEDS

CROSS REFERENCE TO RELATED APPLICATION

This is a continuation-in-part of U.S. patent application Ser. No. 10/369,359 filed on Feb. 18, 2003.

TECHNICAL FIELD

This invention relates to using a hydrogen generator, such as a small catalytic partial oxidizer (mini-CPO), a homogeneous, non-catalytic partial oxidizer (POX), an auto-thermal reformer (ATR), a catalytic steam reformer, or a small water hydrolyzer, to generate hydrogen-containing reformate as an input, along with natural gas, liquified petroleum gas, or other hydrocarbon fuels, for hydrogen desulfurization (HDS) in the production of hydrogen from hydrocarbon fuels, for use, for instance, in fuel cell power plants, refineries, or other processes.

BACKGROUND ART

Fuel cell power plants use hydrogen as the fuel. Current technology includes conversion of hydrocarbon feeds to hydrogen by passing natural gas through a desulfurizer, a catalytic partial oxidizer (or other reformer), a water-gas shift reactor, and a preferential carbon monoxide oxidizer for the generation of significant hydrogen for use as a fuel in a fuel cell, in which hydrogen and oxygen on opposite sides of the electrolyte are converted to electricity and water, in the known fashion.

Referring to FIG. 1, hydrogen reformate is generated in a line 13 by a major reformer 14, such as a catalytic partial oxidizer (CPO), an auto-thermal reformer or a steam reformer, which in turn receives desulfurized hydrocarbon fuel, such as natural gas, over a line 16 from a hydrogen desulfurizer 17. The hydrogen desulfurizer 17 receives hydrocarbon fuel over a line 19. The CPO 14 also receives humidified air, from a suitable source such as an enthalpy recovery device, over a line 23. In the CPO 14, the hydrocarbons in the fuel react with the humidified air on a catalyst, such as rhodium, iridium or zirconia, to produce in the line 13 reformate which, for methane feedstock, is roughly 37% hydrogen, 14% CO, 4% $CO_2$ and traces of other gases, which is further processed with water from a line 24 in a water-gas shift reactor 26 and a preferential CO oxidizer 27 to make it suitable for use as fuel in a line 31, such as for a fuel cell.

However, the hydrogen desulfurizer requires hydrogen enrichment in order to convert sulfur compounds, such as thiophene, into hydrogen sulfide, which is captured on adsorbents, such as zinc oxide. This hydrogen is provided by a hydrogen recycle blower 30 which pressurizes hydrogen from the line 31 and applies it over lines 32 and 33 to the hydrogen desulfurizer 17. A plurality of valves 34 allow adjustment of the processes, all as is known.

Problems with this system include the fact that the hydrogen blower 30 is expensive, and it consumes on the order of 2 kW of the power generated by the fuel cell for a 150 kW fuel cell power plant. Additionally, there is a significant amount of steam present in the hydrogen recycle stream 32 which has a negative impact on the hydrogen sulfide adsorption on zinc oxide in the hydrogen desulfurizer 17. This can impair the reduction of the level of sulfur, which must reach the parts-per-billion (pbb) level for fuel cell applications and to avoid rapid deactivation of catalysts used in the process.

DISCLOSURE OF INVENTION

Objects of the invention include providing hydrogen to a hydrogen desulfurizing unit: which has less humidity in it than is provided by hydrogen recycled from a reformate stream, which does not require equipment costing several thousand dollars, and which requires substantially no energy for operation; and provision of: improved hydrogen generation, such as for fuel in a fuel cell; a lower cost source of hydrogen-containing reformate; and reduced parasitic power in a fuel cell power plant utilizing hydrogen-containing reformate.

This invention is predicated on the discovery that the higher temperature in a hydrogen desulfurizer, which results from using hydrogen generated in a mini-reformer, prevents the carbon monoxide in the reformer product from having any significant adverse effect on the precious metal catalyst (such as platinum) or the adsorption material (such as zinc oxide) in a hydrogen desulfurizer.

According to the present invention, hydrocarbon feed (such as natural gas) and air are fed to a small hydrogen generator to generate hydrogen rich reformate to be fed to a hydrogen desulfurizer, thereby eliminating the need for a hydrogen recycle blower. The invention reduces cost, power consumption and moisture in the hydrogen gas provided to a hydrogen desulfurizer.

According to the invention further, the small hydrogen generator is run in a nearly steady state condition, obviating the need for controls; any excess hydrogen that is generated simply becoming part of the fuel stream, which is economically utilized.

By providing dry reformate to the hydrogen desulfurizer, the adsorption of sulfur on the zinc oxide is enhanced, reducing sulfur to the parts per billion level, which is significant. The invention also provides a certain amount of heat which raises the desulfurizing process from about 260° C. (500° F.) to about 350° C. (662° F.), thereby to aid in the desulfurizing process.

According to the invention, the hydrogen generator may be a small catalytic partial oxidizer (mini-CPO), a homogeneous non-catalytic partial oxidizer (mini-POX), a small auto-thermal reformer (mini-ATR), a small catalytic steam reformer, a small water electrolyzer, or any other unit that produces hydrogen suitable for use in hydrogen desulfurization, particularly any unit that produces dry hydrogen at an elevated temperature with no parasitic cost or loss of efficiency.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a simplified schematic diagram of a hydrogen desulfurizer being supplied hydrogen rich reformate generated by a mini-CPO, in accordance with the present invention.

FIGS. 3 and 4 are partial, simplified schematic diagrams of the embodiment of FIG. 2 except using a mini-POX and a mini-ATR, respectively.

MODE(S) FOR CARRYING OUT THE INVENTION

Figure 1:
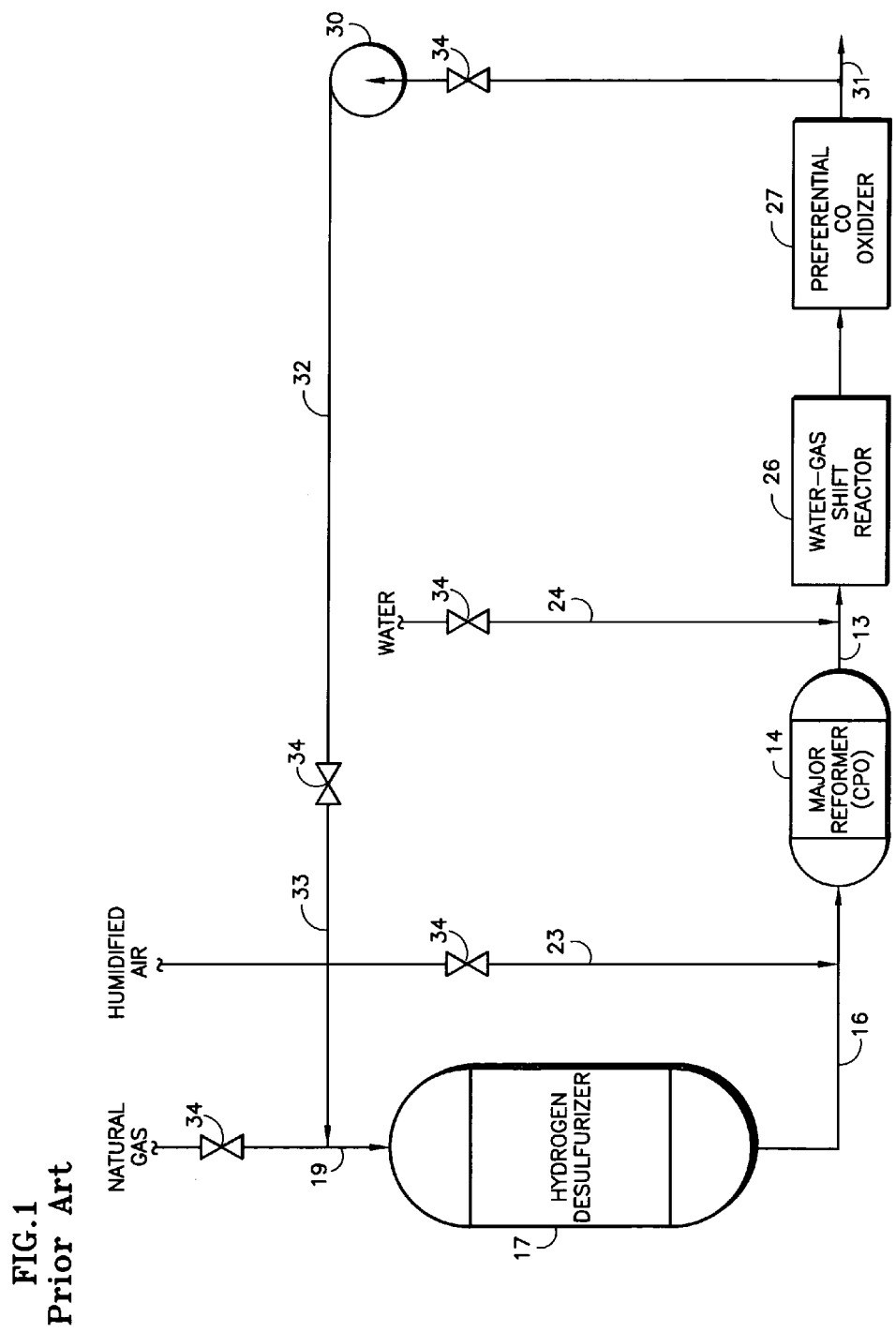
FIG. 1 is a simplified schematic illustration of a hydrogen desulfurizer feeding a major reformer, with recycled hydrogen gas being provided through a hydrogen blower to the hydrogen desulfurizer, as known in the prior art.

Referring to FIG. 2, a mini-reformer, such as a mini-CPO 36, about the size of a 12 ounce beverage can, receives humidified air through a valve 37 and receives hydrocarbon fuel, such as natural gas, through a fixed orifice 38. The multiplicity of valves and the fixed orifice allows adjusting the correct flows to the mini-CPO, the hydrogen desulfurizer and the major reformer. In the mini-CPO, the fuel, which for natural gas, is typically more than 99% methane with traces of sulfur compounds, nitrogen and other hydrocarbons, is converted, along with the humidified air, to reformate, which may comprise roughly 30% hydrogen, 12% CO, and small amounts of other gases such as $CO_2$ and $H_2O$, nitrogen from the humidifier, and unconverted hydrocarbons.

The reformate produced by the mini-CPO 36 in a line 40 is mixed with the fuel in the line 19 at the inlet to the hydrogen desulfurizer 17. Since no water is applied to the mini-CPO, the reformate is much drier than the reformate generated in the line 31 (FIG. 1) by the water-shift reactor 26 and preferential CO oxidizer 27 which provides significant humidity in the reformate in the line 31. Thus, a drier reformate is provided (about 2.8 mol % steam from the mini-CPO compared with about 8.8 mol % steam in the prior art) to the hydrogen desulfurizer, which enhances the adsorption on zinc oxide and helps to reduce the sulfur to the parts per billion level.

Although there is carbon monoxide in the CPO reformate, the heat input from the mini-CPO helps the hydrogen desulfurizer to run at between 650° F. (343° C.) and 750° F. (400° C.); these temperatures are high enough so that the carbon monoxide has only a relatively small negative effect on the desulfurizer catalyst. Thus, a further benefit of the present invention is that it provides some heat to enhance the desulfurization process.

The small hydrogen generator in the embodiment of FIG. 2 is a mini-CPO. However, the small hydrogen generator may be a mini-POX 36a as illustrated in FIG. 3, a mini-ATR 36b as illustrated in FIG. 4, or it may be a small catalytic steam reformer, a small water electrolyzer, or any other type of hydrogen generator that will produce hydrogen.

The small hydrogen generator may operate with dry air, if desired, although humidified air is presently thought to be preferable. The major reformer 14 may be a CPO, a catalytic steam reformer, or an autothermal reformer. The invention may be used in desulfurization processes for other than fuel cell power plants, such as in a refinery, or even in futuristic fuel (e.g., gasoline) stations.

Because the use of the small hydrogen generator will increase the temperature at the inlet to the hydrogen desulfurizer, the hydrogen generator may be configured with several layers of adsorbent material interspersed with several layers of precious metal hydrogen desulfurizing catalyst material so that the adsorbent may be replaced regularly, without either discarding or sorting through the catalyst to reclaim it, as is disclosed in copending U.S. patent application Ser. No. 10/386,317, filed Mar. 11, 2003.

Although the invention is well suited to provide hydrogen-rich reformate fuel for fuel cells, it may be used in refineries for desulfurization of all types of hydrocarbon fuels, such as natural gas, liquified petroleum gas, gasoline, diesel (including JP-8), kerosene, and other fuels generated from biomass and the like.

Although the embodiment described herein is used in the desulfurization of natural gas, it may also be used in the desulfurization of other hydrocarbon feeds such as liquified petroleum gas, gasoline, diesel fuel, methane, and the like.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of providing desulfurized hydrocarbon feed, comprising:
   producing hydrogen-rich reformate from undesulfurized hydrocarbon feed in a small hydrogen generator; and
   feeding said hydrogen-rich reformate along with the undesulfurized hydrocarbon feed to a hydrogen desulfurizer.

2. A method according to claim 1 wherein said producing step comprises:
   producing hydrogen-rich reformate from the undesulfurized hydrocarbon feed and humidified air.

3. Apparatus for providing desulfurized hydrocarbon feed, comprising:
   means including a small hydrogen generator for producing hydrogen-rich reformate from undesulfurized hydrocarbon feed;
   a hydrogen desulfurizer; and
   means for feeding said hydrogen-rich reformate along with the undesulfurized hydrocarbon feed to said hydrogen desulfurizer.

4. A system for desulfurizing hydrocarbon feeds, comprising:
   a source of undesulfurized hydrocarbon feed;
   a small hydrogen generator receiving said undesulfurized hydrocarbon feed from said source and providing hydrogen-containing reformate gas; and
   a hydrogen desulfurizer receiving said undesulfurized hydrocarbon feed from said source of undesulfurized hydrocarbon feed and receiving said hydrogen-containing gas from said small hydrogen generator.

5. A system according to claim 4 further comprising:
   a source of humidified air; and wherein
   said small hydrogen generator receives humidified air from said source of humidified air to produce said reformate gas from said undesulfurized hydrocarbon feed and said humidified air.

6. A system according to claim 4 wherein:
   said small hydrogen generator is a mini-OPO (catalytic partial oxidizer).

7. A system according to claim 4 wherein:
   said small hydrogen generator is a mini-POX (non-catalytic partial oxidizer).

8. A system according to claim 4 wherein:
   said small hydrogen generator is a mini-ATR (autothermal reformer).

9. A system for producing hydrogen-rich reformate from hydrocarbon feeds, comprising:
   a source of undesulfurized hydrocarbon feed;
   a source of humidified air;
   a source of water;

a small hydrogen generator receiving undesulfurized hydrocarbon feed from said source of undesulfurized hydrocarbon feed to produce a first stream of hydrogen-containing reformate gas;

a hydrogen desulfurizer receiving undesulfurized hydrocarbon feed from said source of undesulfurized hydrocarbon feed and said first stream of hydrogen-containing reformate gas from said small hydrogen generator, and providing desulfurized hydrocarbon feed; and a fuel processor including a major reformer receiving said desulfurized hydrocarbon feed and said humidified air and producing a second stream of hydrogen-containing reformate, a water-gas shift reactor receiving said second stream of hydrogen-containing reformate and said water and feeding the resultant gas into a preferential CO oxidizer, for producing a third stream of hydrogen-containing reformate for use as fuel, whereby recycled hydrogen gas from the output of said fuel processor in said third stream is not required for said desulfurizer, thereby (a) eliminating the need for an expensive, power consuming hydrogen blower and (b) reducing the steam fed into said hydrogen desulfurizer.

10. A system according to claim 9 wherein:

said small hydrogen generator receives said humidified air to produce said first stream of reformate gas from said undesulfurized hydrocarbon feed and said air.

11. A system according to claim 10 wherein:

said small hydrogen generator is a mini-CPO (catalytic partial oxidizer).

12. A system according to claim 10 wherein:

said small hydrogen generator is a mini-POX (non-catalytic partial oxidizer).

13. A system according to claim 9 wherein:

said small hydrogen generator is a mini-ATR (autothermal reformer).

* * * * *